United States Patent Office 3,514,272
Patented May 26, 1970

3,514,272
PROCESS FOR VANADIDING METALS
Newell C. Cook, Schenectady, N.Y., assignor to General Electric Company, a corporation of New York
No Drawing. Filed Nov. 10, 1966, Ser. No. 593,301
Int. Cl. B23p 3/00; C13b 5/30
U.S. Cl. 29—194                   14 Claims

ABSTRACT OF THE DISCLOSURE

A vanadide coating is formed on specified base metal compositions by forming an electric cell containing certain metal compositions as a cathode joined through an external electrical circuit to a vanadium anode using a specified fused salt electrolyte maintained at a temperature of at least 800° C., up to the melting point of the metal composition. This cell generates electricity, but, if desired, an external E.M.F. may be impressed providing the current density does not exceed 10 amperes/dm.$^2$. The vanadium diffuses into the base metal to form a tight, adherent coating composed of vanadium and the base metal. This process is useful for forming such compositions on the base metal.

---

This invention relates to a method for metalliding a base metal composition. More particularly, this invention is concerned with a process for vanadiding a base metal composition in a fused salt bath.

I have discovered that a uniform tough, adherent vanadide coating can be formed on a specific group of metals employing low current densities, that is, current densities in the range of 0.05–10 amperes/dm.$^2$.

In accordance with the process of this invention, the vanadium metal is employed as the anode and is immersed in a fused salt bath composed essentially of a member of the class consisting of the alkali metal fluorides, mixtures thereof and mixtures of the alkali metal fluorides with a member of the class consisting of calcium fluoride, strontium fluoride and barium fluoride and containing from 0.01–5 mole percent of vanadium fluoride. The cathode employed is the base metal upon which deposit is to be made. I have found that such a combination is an electric cell in which an electric current is generated when an electrical connection, which is external to the fused bath, is made between the base metal cathode and the vanadium anode. Under such conditions, the vanadium dissolves in the fused salt bath and vanadium ions are discharged at the surface of the base metal cathode where they form a deposit of vanadium which immediately diffuses into and reacts with the base metal to form a vanadide coating. In the specification and claims I use the term "vanadiding" to designate any solid solution or alloy of vanadium and the base metal regardless of whether the base metal does or does not form an intermetallic compound with vanadium in definite stoichiometric proportions which can be represented by a chemical formula.

The rate of dissolution and deposition of the vanadium is self regulating in that the rate of deposition is equal to the rate of diffusion of the vanadium into the base metal cathode. The deposition rate can be decreased by inserting some resistance in the circuit. A faster rate can be obtained by impressing a limited amount of voltage into the circuit to supply additional direct current.

The alkali metal fluorides which can be used in accordance with the process of this invention include the fluorides of lithium, sodium, potassium, rubidium and cesium. However, it is preferred to employ an eutectic mixture of sodium fluoride and lithium fluoride because some free alkali metal is produced by a displacement reaction and potassium, rubidium and cesium are readily volatilized with the obvious disadvantages. It is particularly preferred to employ lithium fluoride as the fused salt bath in which the vanadium fluoride is dissolved, because at the temperatures at which the cell is operated, lithium metal is not volatilized to any appreciable extent. Mixtures of the alkali metal fluorides with calcium fluoride, strontium fluoride and/or barium fluoride can also be employed as a fused salt in the process of this invention.

The chemical composition of the fused salt bath is critical if good vanadide coatings are to be obtained. The starting salt should be as anhydrous and as free of all impurities as is possible or should be easily dried or purified by simply heating during the fusion step. The process must be carried out in the substantial absence of oxygen since oxygen interferes with the process by forming vanadium oxide and thereby preventing a firmly adhering film of vanadium from being deposited on the base metal cathode. Thus, for example, the process can be carried out in an inert gas atmosphere or in a vacuum. By the term "substantial absence of oxygen" it is meant that neither atmospheric oxygen nor oxides of metals are present in the fused salt bath. The best results are obtained by starting with reagent grade salts and by carrying out the process under vacuum or an inert gas atmosphere, for example, in an atmosphere of argon, helium, neon, krypton or xenon.

I have sometimes found that even commercially available reagent grade salts must be purified further in order to operate satisfactorily in my process. This purification can be readily done by utilizing scrap base metal articles as the cathodes and carrying out the initial vanadiding runs with or without an additional applied voltage, thereby plating out and removing from the bath those impurities which interfere with the formation of high quality vanadide coatings.

The base metals which can be vanadided in accordance with the process of this invention included the metals having atomic numbers of from 24 to 29, 41 to 47 and 73 to 79 inclusive. These base metals are, for example, chromium, manganese, iron, cobalt, nickel, copper, niobium, molybdenum, technetium, ruthenium, rhodium, palladium, silver, tantalum, tungsten, rhenium, osmium, iridium, platinum and gold. Alloys of these base metals with each other or alloys containing these base metals as the major constituent, that is, over 50 mole percent, alloyed with other metals as a minor constituent, that is, less than 50 mole percent, can also be vanadided in accordance with my process, providing the melting point of the resulting alloy is not lower than the temperature at which the fused salt bath is being operated. It is preferred that the alloy contain at least 75 mole percent of the base metal and even more preferred, that the alloy contain 90 mole percent of the base metal with correspondingly less of the alloying constituent.

I have also found that it is advantageous to conduct the vanadiding process in the absence of carbon, because carbon forms a very stable vanadium carbide on the surface of the base metals thereby rendering it difficult to further vanadide the base metal and giving less firmly adhering deposits. I have found that carbon can be removed from the fused salt bath by operating it as a cell, until the carbide coating is no longer formed on the surface of the base metal.

The form of the anode is not critical. For example, I can employ as the anode pure vanadium metal in the form of a rod or strip or the vanadium can be employed in the form of chips in a porous iron or monel basket.

In order to produce reasonably fast plating rate and to insure the diffusion of the vanadium into the base metal to form a vanadide, I have found it desirable to operate my process at a temperature in the range of from about 800° C. to 1200° C. It is preferred to operate at temperatures of from 900°–1100° C.

The temperature at which the process of this invention is conducted is dependent to some extent upon the particular fused salt bath employed. Thus, for example, when temperatures as low at 800° C. are desired, an eutectic of sodium and lithium fluoride can be employed. Inasmuch as the preferred operating range is from 900° C. to 1100° C., I prefer to employ lithium fluoride as the fused salt.

When an electrical circuit is formed external to the fused salt bath by joining the vanadium anode to the base metal cathode by means of a conductor, an electric current will flow through the circuit without any applied electromotive force. The anode acts by dissolving in the fused salt bath to produce electrons and vanadium ions. The electrons flow through the external circuit formed by the conductor and the vanadium ions migrate through the fused salt bath to the base metal cathode to be metallided, where the electrons discharge the vanadium ions forming a vanadide coating. The amount of current can be measured with an ammeter which enables one to readily calculate the amount of vanadium being deposited on the base metal cathode and being converted to the metallide layer. Knowing the area of the article being plated, it is possible to calculate the thickness of the metallide coating formed, thereby permitting accurate control of the process to obtain any desired thickness of the vanadide layer.

Although the process operates very satisfactorily without impressing any additional electromotive force on the electrical circuit, I have found it possible to apply a small voltage when it is desired to obtain constant current densities during the reaction, and to increase the deposition rate of the vanadium being deposited without exceeding the diffusion rate of the vanadium into the base metal cathode. The additional E.M.F. should not exceed 1.0 volt and preferably should fall between 0.1 and 0.5 volt.

When it is desirable to apply additional voltage to the circuit in order to shorten the time of operation, the total current density should not exceed 10 amperes/dm.$^2$. At current densities above 10 amperes/dm.$^2$, the vanadium deposition rate exceeds the diffusion rate and the base metal cathode becomes coated with a plate of pure vanadium.

Since the diffusion rate of vanadium into the cathode article varies from one material to another, with temperature, and with the thickness of the coating being formed, there is always a variation in the upper limits of the current densities that may be employed. Therefore, the deposition rate of the iding agent must always be adjusted so as not to exceed the diffusion rate of the iding agent into the substrate material if high efficiency and high quality diffusion coatings are to be obtained. The maximum current density for good vanadiding is 10 amperes/dm.$^2$, when operating within the preferred temperature range of this disclosure. Higher current densities can sometimes be used to form coatings with vanadium but in addition to the formation of a metallide coating, plating of the iding agent occurs over the diffusion layer.

Very low current densities (0.01–0.1 amp./dm.$^2$) are often employed when diffusion rates are correspondingly low, and when very dilute surface solutions or very thin coatings are desired. Often the composition of the diffusion coating can be changed by varying the current density, producing under one condition a composition suitable for one application and under another condition a composition suitable for another application. Generally, however, current densities to form good quality vanadium coatings fall between 0.5 and 5 amperes per dm.$^2$ for the preferred temperature ranges of this disclosure.

If an applied E.M.F. is used, the source, for example, a battery or other source of direct current, should be connected in series with the external circuit so that the negative terminal is connected to the external circuit terminating at the base metal being vanadided and the positive terminal is connected to the external circuit terminating at the vanadium anode. In this way, the voltages of both sources are alegbraically additive.

As will be readily apparent to those skilled in the art, measuring instruments such as voltmeters, ammeters, resistances, timers, etc., may be included in the external circuit to aid in the control of the process.

Because the tough adherent corrosion resistant properties of the vanadide coatings are uniform over the entire treated area, the vanadide coated metal compositions prepared by my process have a wide variety of uses. They can be used to fabricate vessels for chemical reactions, to make gears, bearings and other articles requiring hard, wear-resistant surfaces. Other uses will be readily apparent to those skilled in the art as well as other modifications and variations of the present invention in light of the above teachings.

The following examples serve to further illustrate my invention. All parts are by weight unless otherwise stated.

EXAMPLE 1

Lithium fluoride (11,350 grams) was charged into a monel liner (6" in diameter x 17¾" deep), fitted into a mild steel pot (6⅜" diameter x 18" deep). The pot was fitted with a nickel plated steel flanged lid which contained a water channel for cooling, two ports (2¼" in diameter) for glass electrode towers, and two 1" port for a thermocouple probe and a gas bubbler. The whole apparatus was encased in an electrical furnace for heating. A vacuum was pulled on the cell and the lithium fluoride melted.

The vacuum was replaced with argon and with argon flushing through one of the ports to prevent air from getting into the cell, vanadium trifluoride (47 grams) was addded to the molten lithium fluoride to make the vanadium ion concentration 0.1 mole percent.

A vanadium metal anode ½" square x 6" long was immersed in the fused salt to a depth of 4" and with argon flowing through the cell, to prevent any oxygen from getting into the cell, a run was made in accordance with the conditions set forth in the following table against a nickel strip.

TABLE I

| Time (mins.): | Volts anode polarity | Current density, amps/dm.$^2$ | |
|---|---|---|---|
| 0 | −0.330 | 0 | |
| 1 | −0.092 | 0.4 | Current on. |
| 3 | +0.150 | 0.4 | |
| 31 | +0.600 | 0.4 | Current off. |
| 31:10 | −0.180 | 0 | |
| 32 | +0.610 | 0.4 | Current on. |
| 120 | +0.620 | 0.4 | Current off. |
| 120:10 | −0.004 | 0 | |
| 121 | −0.105 | 0 | |
| 122 | −0.146 | 0 | Sample out. |

The sample on removal from the salt bath had a thick, black deposit adhering to it which readily washed off revealing a grey surface. The sample had gained 0.111 g. as compared to a theoretical of 0.945 g. based on the reduction of $V^{++}$ ions to $V^°$. X-ray emission and chemical reagents showed the coating to contain vanadium. The coating was 0.4 mil. thick, was flexible and very hard (>700 Knoop hardness). Microscopic examination showed a gradual drop in vanadium content and no sharp boundary line between the coating and the nickel base.

Seven additional runs were made employing nickel cathodes for a total of 35 ampere hours at which time the nickel strips came from the cell shiny and with no adhering black deposit, indicating that interfering materials had now been removed from the fused salt bath. A typical run of a nickel cathode (6" x 1" x 0.020") in the electrolytically cleaned cell is shown in the following table:

TABLE II

| Time (mins.) | Volts anode polarity | Current density, amps/dm.² |
|---|---|---|
| 0 | −0.155 | 0 |
| 1 | −0.082 | 0.35 |
| 10 | −0.040 | 0.35 |
| 140 | +0.088 | 0.35 |
| 150 | +0.096 | 0.35 |
| 150:10 | +0.026 | 0 |
| 151 | +0.004 | 0 |
| 156 | −0.090 | 0 |

The sample gained 0.340 gram of a theoretical 0.390 gram and had developed a 1.5 mil. coating that was shiny, smooth and hard. X-ray examination showed the presence of both vanadium and nickel on the surface and no other elements, showing the coating to be all diffusion.

Table III gives a large number of additional examples of base metals which were vanadided in the cell described in Example 1 after the last nickel run and under an argon atmosphere. The conditions and times of reaction are given in the table. All yields are based on the reduction of $V^{++}$ ions to metallic vanadium.

TABLE III

| Example | Metal | Temp., °C. | Time, min. | Current density, amps/dm.² | Wt. gained, grams | Percent coulombic efficiency | Description of coating |
|---|---|---|---|---|---|---|---|
| 2 | Cobalt | 1,100 | 15 | 0.52 | 0.210 | 50 | 1.5 mil coat; dark, smooth, very hard outer portion (>700 Knoop Hardness Number). |
| 3 | 1015 C.R. steel | 1,090 | 45 | 1.0 | 0.541 | 80 | 0.7 mil coat; light grey, smooth, very hard outer portion. |
| 4 | C.R. steel | 1,100 | ¹18 | 0.35 | 2.67 | 60 | 6 mil coat; dark, grainy, very hard surface (>700 Knoop Hardness Number). |
| 5 | Chromium | 1,090 | 15 | 3.3 | 0.12 | 20 | 0.5 mil coat, grey, smooth, hard. |
| 6 | Niobium | 1,100 | 30 | 1.8 | 0.092 | 100 | 1 mil coat; shiny, smooth, hard. |
| 7 | Molybdenum | 1,100 | 90 | 3.1 | 0.103 | 46 | 0.7 mil coat; light grey, smooth. |
| 8 | Tungsten | 1,100 | 30 | 1.25 | 0.075 | 60 | 0.5 mil coat; dark, grainy, soft, primarily a plate of V adhering to a very thin diffusion layer. |
| 9 | Tantalum | 1,100 | 12 | 2.0 | 0.015 | 50 | 0.3 mil coat; grey, smooth, hard. |
| 10 | Gold | 1,000 | 30 | 5.0 | 0.040 | 100 | 2 mil coat; silvery, bright, soft, all diffusion. |
| 11 | Copper | 1,000 | 30 | 1.0 | 0.192 | 80 | 1 mil coat; dark, grainy, hard, very flexible. |
| 12 | Platinum | 1,000 | 12 | 1.0 | 0.017 | 90 | 0.5 mil coat; light grey, smooth, medium hard. |
| 13 | 304 Stainless steel | 1,100 | 40 | 0.8 | 0.215 | 70 | 0.5 mil coat; grey, grainy, hard, very flexible. |
| 14 | Fe-Cr (Cr 28%) | 1,090 | 60 | 0.5 | 0.167 | 72 | 1 mil coat; shiny, smooth, very hard. |
| 15 | Ti-Namel | 1,000 | 30 | 0.7 | 0.065 | 60 | 0.2 mil coat; shiny, smooth. |
| 16 | Borided Ti-Namel | 1,100 | 60 | 1.0 | 0.132 | 65 | 1 mil coat; grey, smooth, very hard. |
| 17 | Nickel | 1,000 | 63 | 0.7 | 0.46 | 93 | 1.5 mil coat; shiny, smooth, very hard surface. |

¹ Hours.

EXAMPLE 18

Into a cell similar to the one described in Example 1, was charged a mixture (1800 grams) containing 39 mole percent sodium fluoride, 58 mole percent potassium fluoride and 3 mole percent of vanadium fluoride. The cell was sealed and a vacuum drawn on the cell and the mixed salt then melted. Argon was allowed to flow into the cell to break the vacuum and a continued flow of argon maintained to prevent air from diffusing into the cell. A vanadium anode ½" square and 6" long was immersed 4" into the salt and the cell run against a scrap nickel cathode for 6 ampere hours to remove impurities in the cell. The scrap cathode was then replaced by a nickel cathode while the cell was maintained at 900° C. and the cell run conducted in accordance with the data set forth in the following table.

TABLE IV

| Time (min.): | Volts anode polarity | Current density, amps/dm.² | |
|---|---|---|---|
| 0 | −0.040 | 0 | |
| 1 | −0.034 | 0.11 | As a battery. |
| 2 | −0.020 | 0.10 | |
| 3 | −0.016 | 0.08 | |
| 4 | −0.010 | 0.10 | External E.M.F. applied. |
| 145 | +0.013 | 0.10 | Current off. |
| 146 | +0.001 | 0 | |
| 150 | −0.001 | 0 | |
| 160 | −0.010 | 0 | |

The sample as removed from the bath was shiny, smooth and had gained 0.142 gram of a theoretical 0.158 gram. The nickel had developed a 1 mil. coating which was hard and very flexible. This coating was shown by X-ray emission to contain vanadium and nickel and no other metals.

This cell was run at 900° employing iron, copper and gold as the cathodes and resulted in vanadide coatings on these metals.

It will, of course, be apparent to those skilled in the art that modifications other than those set forth in the above examples can be employed in the process of this invention without departing from the scope thereof.

What I claim as new and desire to secure by Letters Patent of the United States is:

1. A method of forming a vanadide coating on a base metal composition having a melting point of at least 900° C., at least 50 mole percent of said base metal composition being at least one of the metals selected from the class consisting of metals whose atomic numbers are 24 to 29, 41 to 47 and 73 to 79, said method comprising (1) forming an electric cell containing said metal composition as the cathode, joined through an external electrical circuit to a vanadium anode and a fused salt electrolyte which consists essentially of a member of the class consisting of lithium fluoride, sodium fluoride, mixtures thereof and mixtures of said fluorides with a member of the class consisting of strontium fluoride, calcium fluoride and barium fluoride and from 0.01–5 mole percent of vanadium fluoride, said electrolyte being maintained at a temperature of at least 900° C., but below the melting point of said metal composition, in the substantial absence of oxygen, (2) controlling the current flowing in said electric cell so that the current density of the cathode does not exceed 10 amperes/dm.² during the formation of the vanadide coating, and (3) interrupting the flow of electrical current after the desired thickness of the vanadide coating is formed on the base metal object.

2. The process of claim 1 wherein the electrolyte contains calcium fluoride.

3. The process of claim 1 wherein the electrolyte is a mixture of lithium fluoride, sodium fluoride and vanadium fluoride.

4. The process of claim 1 wherein the electrolyte is a mixture of lithium fluoride and vanadium fluoride.

5. The process of claim 1 wherein the absence of oxygen is obtained by use of a vacuum.

6. The process of claim 1 which is also conducted in the substantial absence of carbon.

7. The method of claim 1 wherein the metal composition is nickel.

8. The method of claim 1 wherein the metal composition is cobalt.

9. The method of claim 1 wherein the metal composition is tungsten.

10. The method of claim 1 wherein the metal composition is molybdenum.

11. The method of claim 1 wherein the metal composition is niobium.

12. The method of claim 1 wherein the metal composition is iron.

13. The method of claim 1 wherein the metal composition is copper.

14. A metal product produced in accordance with the process of claim 1.

References Cited

FOREIGN PATENTS 554,772   3/1958   Canada.

OTHER REFERENCES

"Electrodeposition of Coherent Deposits of Refractory Metals," Journal of the Electrochemical Society, 1965, vol. 112, No. 3, p. 266.

JOHN H. MACK, Primary Examiner

R. L. ANDREWS, Assistant Examiner

U.S. Cl. X.R.

29—196, 198, 199; 204—39